United States Patent
Thompson

(12) 
(10) Patent No.: US 6,302,315 B1
(45) Date of Patent: Oct. 16, 2001

(54) FRICTION STIR WELDING MACHINE AND METHOD

(75) Inventor: Jack Mansfield Thompson, Mason, OH (US)

(73) Assignee: General Tool Company, Cincinnati, OH (US)

( * ) Notice: Subject to any disclaimer, the term of this patent is extended or adjusted under 35 U.S.C. 154(b) by 0 days.

(21) Appl. No.: 09/562,732

(22) Filed: May 1, 2000

(51) Int. Cl.[7] .................................................. B23K 20/12
(52) U.S. Cl. ..................................... 228/112.1; 228/114.5
(58) Field of Search ............................ 228/112.1, 234.1, 228/2.1, 3.1, 25, 114.5, 2.3, 45; 156/580, 73.5; 279/141

(56) References Cited

U.S. PATENT DOCUMENTS

| | | |
|---|---|---|
| 2,148,704 | 2/1939 | Merritt . |
| 2,759,378 | 8/1956 | Youssoufian et al. . |
| 3,507,143 | 4/1970 | Georg . |
| 3,512,476 | 5/1970 | Georg . |
| 3,523,485 | 8/1970 | Klein . |
| 3,559,530 | 2/1971 | Wagner . |
| 3,730,051 | 5/1973 | Hatzig . |
| 3,831,262 * | 8/1974 | Luc . |
| 3,935,420 | 1/1976 | Sandstrom . |
| 4,144,110 | 3/1979 | Lue . |
| 4,155,300 | 5/1979 | Baltschun . |
| 4,470,868 | 9/1984 | MacLaughlin et al. . |
| 4,920,783 | 5/1990 | Greaves et al. . |
| 5,425,607 | 6/1995 | Hardesty . |
| 5,460,317 | 10/1995 | Thomas et al. . |
| 5,611,479 | 3/1997 | Rosen . |
| 5,697,511 | 12/1997 | Bampton . |
| 5,697,544 | 12/1997 | Wykes . |
| 5,713,507 | 2/1998 | Holt et al. . |
| 5,718,366 | 2/1998 | Colligan . |
| 5,758,999 | 6/1998 | Geise . |
| 5,769,306 | 6/1998 | Colligan . |
| 5,794,835 | 8/1998 | Colligan et al. . |
| 5,813,592 | 9/1998 | Midling et al. . |
| 5,829,664 | 11/1998 | Spinella et al. . |
| 5,862,975 | 1/1999 | Childress . |
| 5,893,507 | 4/1999 | Ding et al. . |
| 5,921,461 * | 7/1999 | Kennedy et al. . |
| 5,971,247 | 10/1999 | Gentry . |
| 5,971,252 | 10/1999 | Rosen et al. . |
| 5,972,524 | 10/1999 | Childress . |
| 5,975,406 | 11/1999 | Mahoney et al. . |

* cited by examiner

Primary Examiner—Tom Dunn
Assistant Examiner—Jonathan Johnson
(74) Attorney, Agent, or Firm—Wood, Herron & Evans, L.L.P.

(57) ABSTRACT

A friction stir welding machine includes a table for supporting parts to be welded and a frame extending over the table. A first drive is supported by a first element of the frame and is operatively connected to a spindle having a tool. The first drive moves the tool in a first direction, and the first drive disengages from the spindle after the tool contacts the material. A second drive is supported by a second element of the frame and is operatively connected to the spindle for moving the tool into the parts at a joint, thereby initiating friction stir welding process. The friction stir welding machine has a pair of rollers mounted in a roller support with an axis of rotation substantially perpendicular to an axis of rotation of the tool. The rollers contact a surface of the material in response to the tool penetrating the material to a desired depth. The roller support is pivotally mounted to the spindle and has a pivot axis substantially perpendicular to both an axis of rotation of the rollers and the axis of rotation of the tool. The work supporting table of the friction stir welding machine has a vacuum hold down system for securing the parts to the table.

16 Claims, 8 Drawing Sheets

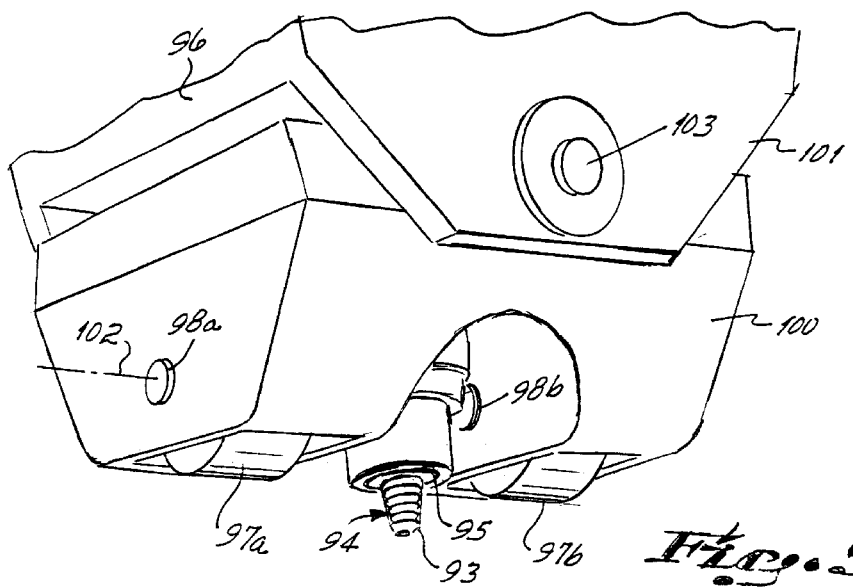
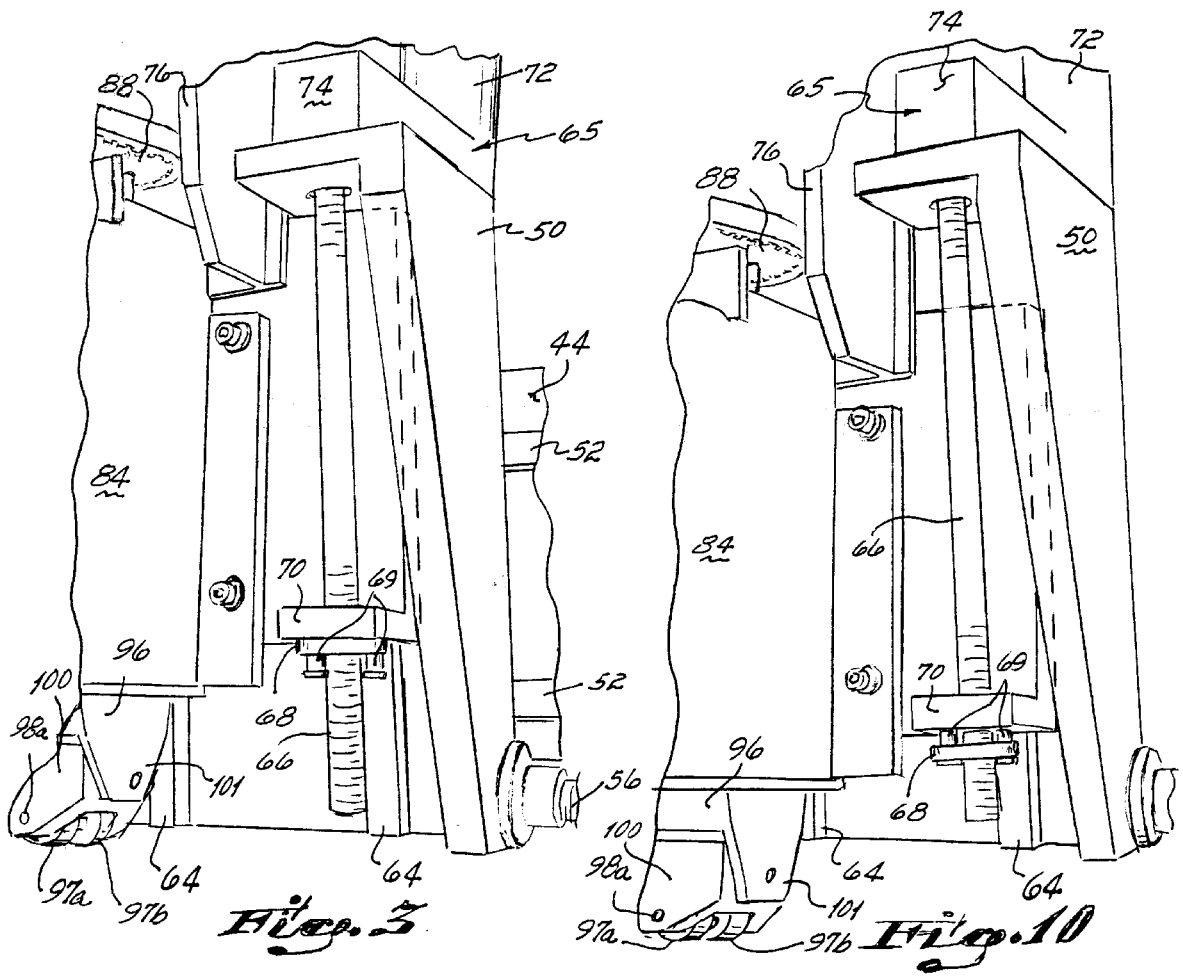

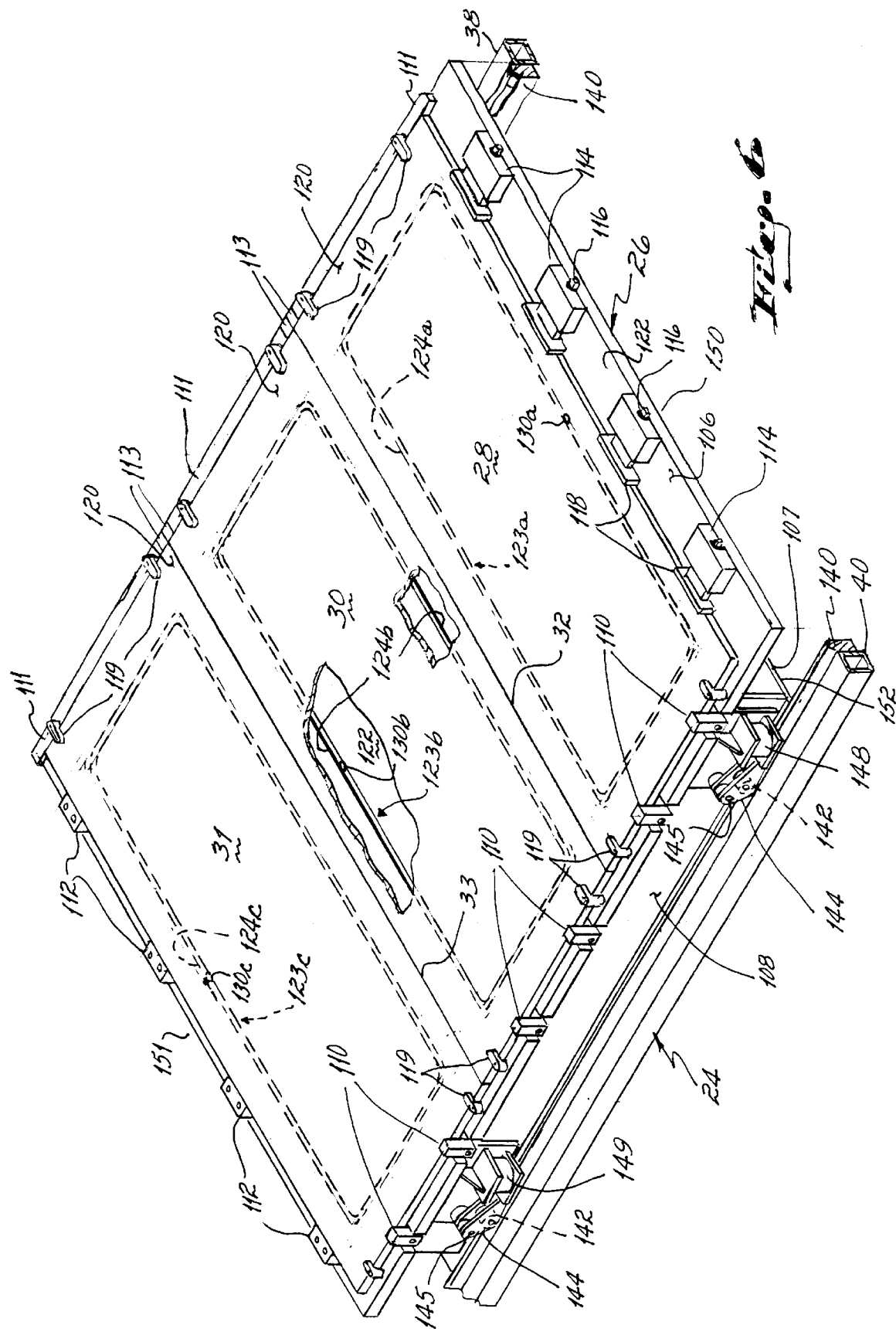

FRICTION STIR WELDING MACHINE AND METHOD

FIELD OF THE INVENTION

The present invention generally relates to welding machines and more particularly, to a friction stir welding machine.

BACKGROUND OF THE INVENTION

The process of friction stir welding is well known and is especially useful for welding a butt joint formed between adjacent metal pieces, for example, aluminum alloys, copper alloys, etc. The process uses a nonconsumable rotating tool comprised of a pin, often threaded, extending from a shoulder. To effect a weld, the rotating pin is forced into the joint and the adjacent metal pieces until a surface of the shoulder contacts the upper surfaces of the workpieces. The friction of the rotating shoulder on the metal pieces plasticizes an annular region of the metal around the pin. The rotating tool is then moved along the joint; and as the pin is moved along the joint, the pressure provided by the leading face of the pin forces hot, plasticized metal to the back of the pin where it fills the void left by the moving pin. After cooling and hardening, the weld left is a fine grained, hot worked joint that is very strong and resistant to breaking.

The friction stir welding process presents several challenges to a machine structure. For example, in moving the rotating tool toward and away from the weld joint and along the weld joint, known drive mechanisms, for example, a screw drive, may be utilized. However, the process of sinking the nonconsumable rotating pin into the solid metal of the weld joint requires a very large force that must be maintained while the pin is traversed along the joint between the metal pieces. A screw drive as well as most other types of drives often found on a machine are normally used to control position and velocity of the member being moved. Using such drives to control force is substantially more complicated. For example, a strain gage or other force measuring device must be implemented to provide a force feedback signal; and a force control loop is then used to control the operation of the screw drive such that the desired force is achieved and maintained. Providing a force control with such known drives is further complicated by force induced deflections that occur in the structure of the machine. Thus, obtaining the desired control over force with known drives is complex and expensive. Therefore, there is a need to provide a machine design by which not only is the position of the rotating tool controlled but the force applied to the tool is also controlled using simple, reliable and inexpensive components.

Another issue in the design of a stir welding machine is how to securely clamp the metal pieces during the welding process. Of particular concern is how to secure the edges of the metal pieces forming the joint to be welded. As will be appreciated, the plunging of the rotating tool into the metal pieces and the high friction forces created by the rotating shoulder on the surfaces of the metal pieces create forces tending to separate the pieces. Further, the heat generated in the process often results in the edges of the metal pieces bending or warping. Further, the thicknesses of the two metal pieces are often not absolutely identical resulting in the weld process tending to work the thicker metal piece more. As a result, an elaborate system of clamps is often used in which a series of clamps is located on both sides of the joint over its entire length. In other applications, a pair of rollers is rigidly connected to, and rotate with, the rotating tool, thereby continuously circling the tool as it is moved along the joint. As will be appreciated, if one metal piece is thicker than the other piece, the circling rollers are constantly hitting the raised edge of the thicker metal piece which may result in undesirable vibrations and wear. Further, with rigid roller axles, as one roller moves up and over the thicker metal piece, the other roller is lifted slightly from the thinner metal piece; and the roller contacting the thicker metal piece applies a greater force than the roller contacting the thinner metal piece. Thus, there is a need for a simple, reliable and inexpensive joint clamping mechanism that applies equal forces to both of the metal pieces even if one piece is thicker than the other piece.

The friction stir welding process produces substantial heat in the metal pieces as well as in the rotating tool and adjacent machine components. The heat may be significant enough to adversely affect the performance or life of components adjacent the rotating tool, for example, the spindle bearings. Therefore, there is a need to provide a friction stir welding machine that limits the transfer of heat from the rotating tool and the welding area to other components of the welding machine.

It is common to clamp two metal pieces, weld a joint, clamp another piece and weld another joint. However, in many applications, it is more efficient to clamp more than two pieces on the welding machine at one time and then, successively weld each of the joints without having to handle individual pieces between the welds. In such an application, it is important that none of the metal pieces move during the welding process, so that all of the joints remain in their desired position ready to be welded. Thus, there is also a need for a relatively simple but effective system for clamping metal pieces to be welded in their desired positions. The work holding system should not only properly clamp the joint being welded, but an effective work holding system should permit a number of metal pieces to be mounted and clamped on a worktable so that a number of joints can be successively welded with minimum handling of the pieces.

SUMMARY OF INVENTION

The present invention provides a friction stir welding machine that moves the rotating tool both in and out of the metal pieces with the necessary forces, in an efficient manner and using economical machine components. The friction stir welding machine of the present invention has a clamping system that is easy to use and permits numerous parts to clamped such that a plurality of joints can be successively welded without handling the metal pieces. The stir welding machine of the present invention also maximizes the life of machine components by limiting the transfer of heat from the rotating friction stir welding tool. Thus, the friction stir welding machine of the present invention has the advantages of being economical to manufacture, easy to use and provides great productivity while consistently producing high quality welded joints.

In accordance with the principles of the present invention and the described embodiments, the friction stir welding machine of the present invention includes a table supporting parts to be welded and a frame extending over the table. A first drive is supported by a first element of the frame and is operatively connected to a spindle having a rotating tool. The first drive moves the rotating tool in a first direction, and the first drive disengages from the spindle after the rotating tool contacts the material. A second drive is supported by a second element of the frame and is operatively connected to the spindle for forcing the rotating tool into the parts at a joint, thereby initiating a friction stir welding process. This embodiment uses two drives and independent machine elements to react forces from those drives.

The dual drives and independent force reacting machine elements have the advantage of being able to control the displacement of the rotating tool, for example, with the first drive and to control the force applied on the rotating tool, for example, with the second drive. The force control system has the advantage of providing a direct control of force independent of deflections in the machine structure. Further, the independent displacement and force control systems are implemented with simple, reliable and relatively inexpensive components.

In one aspect of the invention, the friction stir welding machine includes a third drive mounted on the frame and operatively connected to the spindle for moving the rotating tool in a third direction along the joint between the parts to be welded.

In another embodiment, the friction stir welding machine of the present invention has a pair of rollers mounted to a roller support with an axis of rotation substantially perpendicular to an axis of rotation of the rotating tool. The rollers contact surfaces of two parts to be welded in response to the rotating tool penetrating the parts to a desired depth. The roller support is pivotally mounted to the spindle, and the roller support has a pivot axis substantially perpendicular to both an axis of rotation of the rollers and the axis of rotation of the rotating tool. Thus, the pivoting action of the roller support has the advantage of applying equal forces to both parts even if the parts have different thicknesses.

In a further embodiment, the friction stir welding machine of the invention has a base, and first and second drives supported by the frame and operatively connected to a spindle having a rotating tool for moving the rotating tool in respective first and second mutually directions. A table supporting parts to be welded has a vacuum hold down system for securing the parts to an upper surface of the table. The vacuum hold down system has the advantage of being relatively simple, reliable and less expensive than mechanical clamping systems. In addition, more than two parts can be clamped to the table so that multiple welds can be successively made.

Various additional advantages, objects and features of the invention will become more readily apparent to those of ordinary skill in the art upon consideration of the following detailed description of the presently preferred embodiments taken in conjunction with the accompanying drawings.

BRIEF DESCRIPTION OF DRAWINGS

FIG. 3 is a partial perspective view of the vertical spindle drive of the friction stir welding machine of FIG. 1.

FIG. 5 is a perspective view of a pivoting roller truck mounted on the end of the spindle of the friction stir welding machine of FIG. 1.

FIG. 6 is a perspective view of the work supporting table of the friction stir welding machine of FIG. 1.

FIG. 7 is an exploded view of a portion of a vacuum system employed on the table illustrated in FIG. 6.

FIG. 10 is a partial perspective view of the vertical spindle drive of the friction stir welding machine of FIG. 1 illustrating the drive disengaged from the spindle.

DETAILED DESCRIPTION OF THE INVENTION

Figure 1:
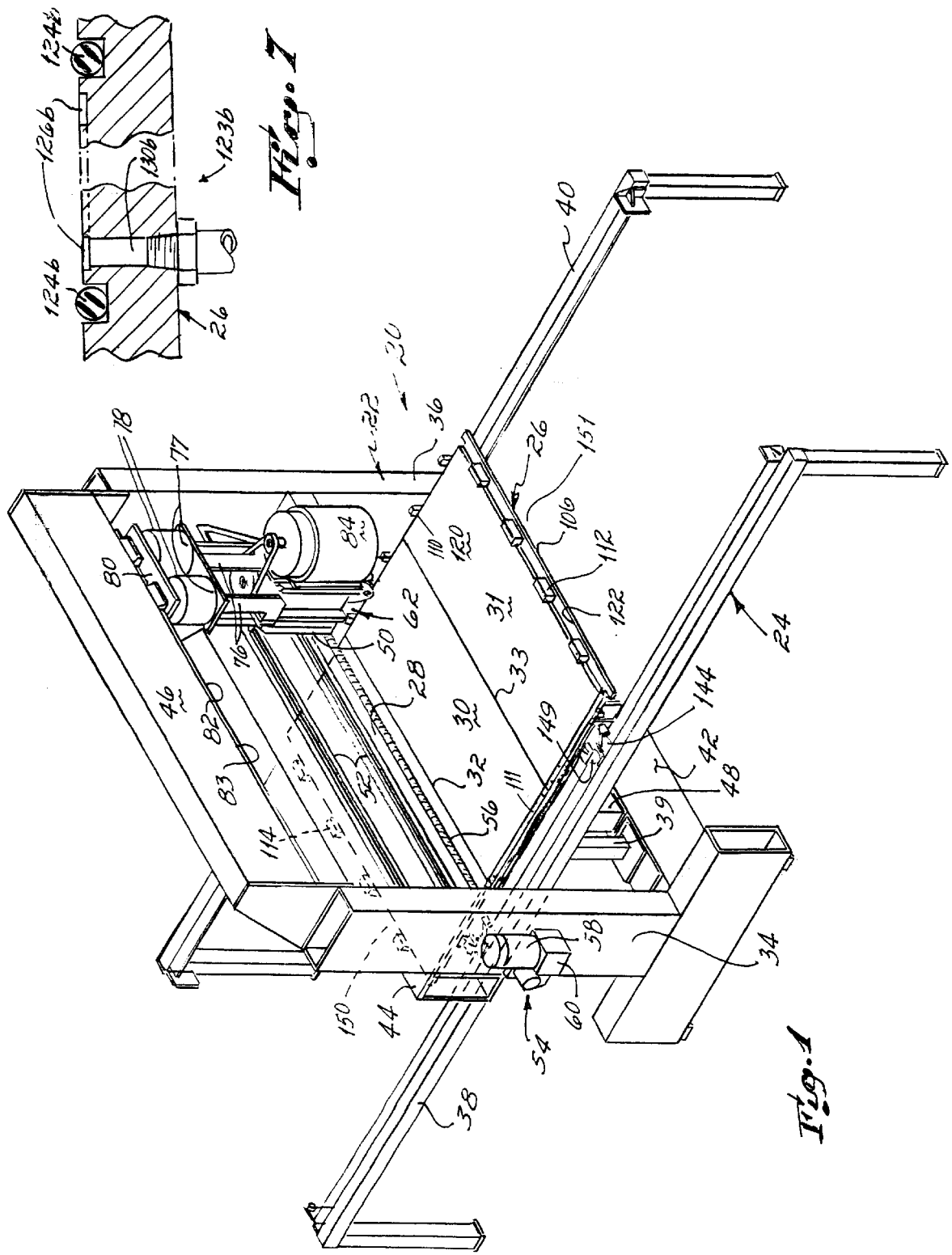
FIG. 1 is a perspective view of a friction stir welding machine in accordance with the principles of the present invention.

A friction stir welding machine 20 is comprised of a frame or gantry 22 and a base 24 extending therethrough. The base 24 supports a work table 26 that is manually slidable along the length of the base 24 in a generally horizontal direction. The work table 28 supports parts 28, 30, 31 secured adjacent each other to form joints 32, 33. Friction stir welding the metal parts 28, 30, 31 along the joints 32, 33 will secure the parts 28, 30, 31 together in a unitary piece. The gantry 22 has a pair of columns or uprights 34, 36 that are spaced outside of, but adjacent to, lateral side rails 38, 40 of the base 24. The columns 34, 36 are joined together by lower, intermediate and upper cross members or cross rails 42, 44, 46, respectively. An anvil 48 is rigidly connected to the top of the lower cross member 42. Each of the side rails 38, 40 is joined to the lower cross member 42 by a post 39 to connect the frame 22 and base 24 into a unitary structure. A spindle carriage or slide 50 is mounted to the intermediate cross member 44 by means of a pair of linear guides or bearings 52. The spindle carriage 50 is also operatively connected to a drive 54 providing motion of the linear carriage 50 in a generally horizontal direction substantially perpendicular to the longitudinal side rails 38, 40 of the base 24. The drive 54 can be of various known types, but the illustrated drive 54 is a five ton "ComDRIVE ACTUATOR" commercially available from Joyce Dayton of Dayton, Ohio. The drive 54 uses a jack or screw 56 having one end rotatably mounted in a bearing attached to the column 363. A nut (not shown) is attached to the rear side of the spindle carriage 50 in a known manner. The drive 54 further includes a source of power 58, for example, a three horsepower AC induction motor, that is coupled to an opposite end of the screw 56 by a mechanical coupling, for example, a worm gear 60 commercially available from Cincinnati Electric of Cincinnati, Ohio. The drive 54 is capable of providing a horizontal drive force of approximately 10,000 pounds.

Figure 2:
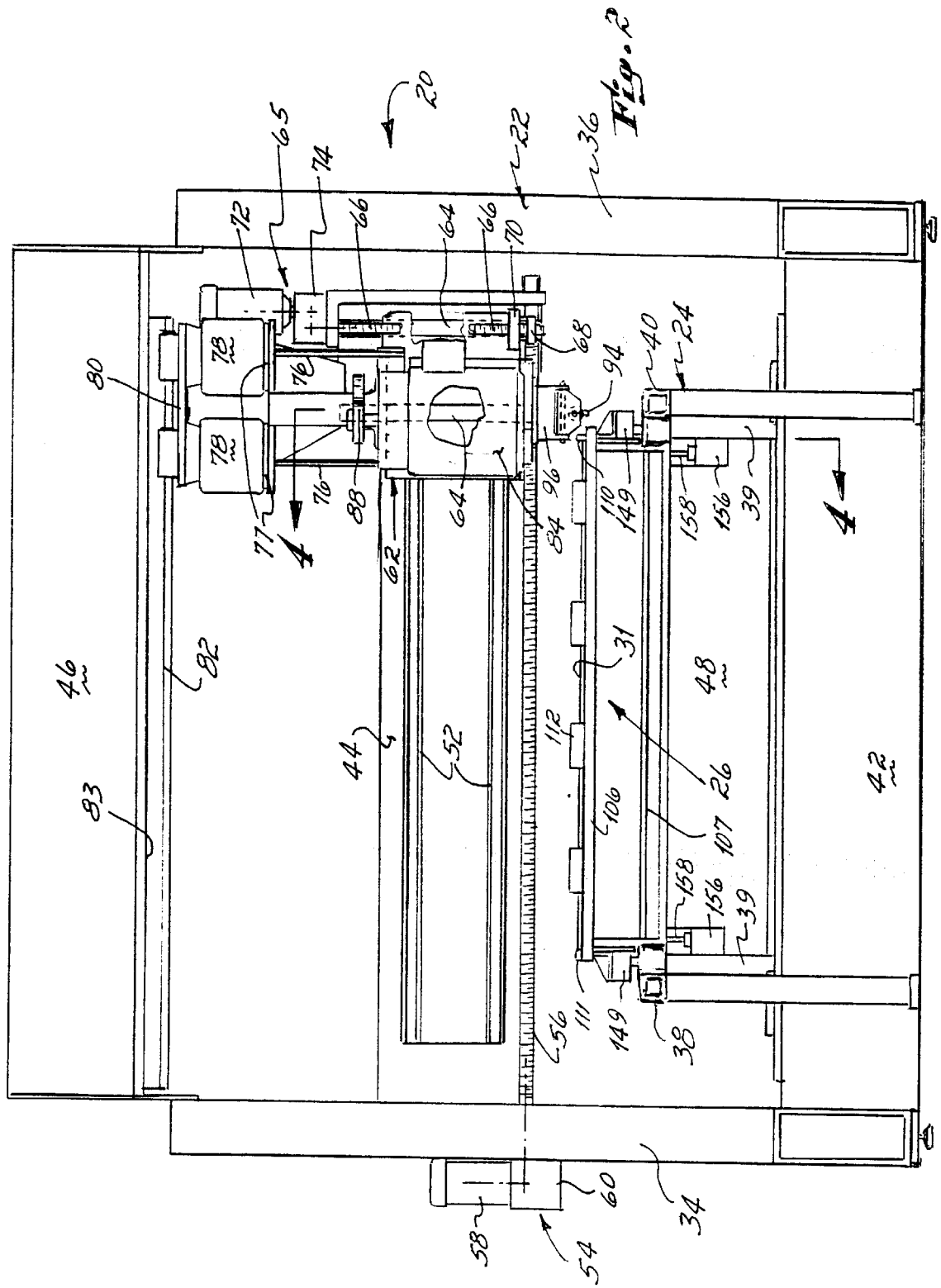
FIG. 2 is an end view in elevation of the friction stir welding machine of FIG. 1.

A spindle or tool head 62 is slidably mounted to the spindle carriage 50 by linear guides or bearings 64. Referring to FIG. 2, a pair of linear guides 64 is used; and the guides 64 are positioned laterally on opposite sides of the spindle carrier 50. The spindle 62 is operatively connected to a second drive 65 for moving the spindle 62 in a generally vertical linear path substantially perpendicular to the spindle carriage guides 52 and the longitudinal side rails 38, 40 of the base 24. The second drive 65 can be of various known types, but the illustrated drive 65 has a screw 66 rotatably mounted at its upper end to the spindle carriage 50. Referring to FIG. 3, the spindle 62 is moved vertically by a nut 68 that carries a bracket 70 rigidly connected to the spindle 62. Referring to FIG. 2, a power source 72, for example, a one horsepower electric motor, is mechanically coupled to an upper end of the screw 66 through a gear box 74. Thus, rotation of the motor 72 and screw 66 is operative to move the nut 68 that carries the bracket 70 and spindle 62 in a generally vertical direction.

The spindle 62 is rigidly connected to a lower end of a pair of rods or brackets 76 that have upper ends connected to movable portions 77 of respective drive 78. The drive 78 functions as a weld force generator and is comprised of a pair of power actuators, for example, air stroke actuators Model No. 1T15S-6 commercially available from Firestone of Carmel, Ind. The air stroke actuators 78 have a desirable characteristic of having a limited stroke or displacement within their total range of displacement in which they apply a relatively constant force through that limited displacement. Thus, through that limited displacement, the force being applied by the actuators is a known, relatively constant magnitude and is applied independent of any deflections in the structure of the machine. The actuators 78 have movable portions 77 rigidly connected to a plate 80 that is slidably mounted to the upper cross member 46 by means of a linear guide 82. The linear guide 82 is located substantially along a longitudinal centerline of a lower surface 83 of the upper cross member 46. The linear guides 52, 64, 82 are known devices such as Tompson linear guides commercially available from Tompson of Port Washington, N.Y.

Figure 4:
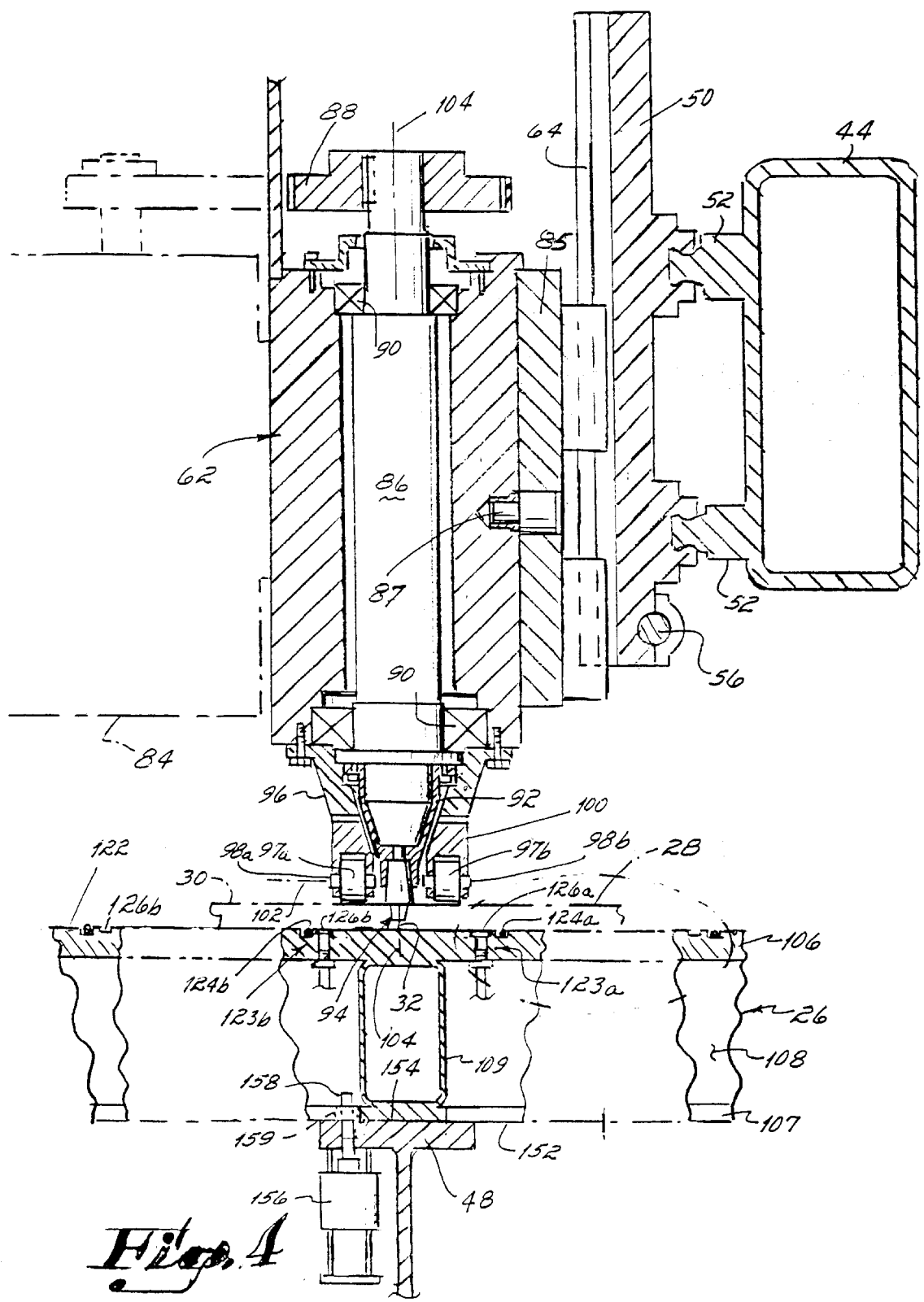
FIG. 4 is a cross-sectional view taken along line 3—3 of FIG. 1 illustrating the major components within the spindle of the friction stir welding machine of FIG. 1.

Referring to FIG. 5, a rotating tool 94 is comprised of pin portion 93 that extends from a shoulder surface 95 substantially perpendicular to a centerline of the pin 93. Referring to FIG. 2, in a friction stir welding process, it is often desirable to orient the rotating tool 94 at a slight angle, for example, between one and five degrees, so that the centerline of the rotating tool is not perfectly perpendicular to the upper surface of the workpiece. This can be accomplished by rotating the spindle 62 clockwise through a small angle about an axis of rotation parallel to the side rails 38, 40. Referring to FIG. 4, the spindle 62 is pivotally mounted to a plate 85 by means of a pivot pin 87; and the plate 85 is mounted to the linear guides 64 on the spindle carriage 50. Thus, the spindle 62 and rotating tool 94 can be angularly displaced, for example, up to five degrees, and clamped to the plate 85 by bolts or other means.

The rotating tool 94 is powered by a spindle motor 84, for example, a 25 horsepower motor commercially available from Cincinnati Electric mounted on the spindle 62. Referring to FIG. 4, the spindle motor 84 is rotatably coupled to an upper end of a spindle shaft 86 by means of a belt drive 88. The spindle shaft 86 is rotatably mounted in the spindle 62 by bearings 90. A tool holder 92 is mounted to a lower end of the spindle shaft 86, and a tool or pin 94 is mounted within the tool holder 92. The tool holder 92 is made from a material having a low thermal conductivity, for example, stainless steel, so that only minimal heat from the welding process and in the tool 92 is conducted to other components, for example, the bearings 90, of the spindle 62. A spindle cover 96 is also connected to the lower end of the spindle 62 and covers a portion of the lower end of the spindle shaft 86. Rollers 97a, 97b are rotatably mounted in a roller support or truck 100 on respective axles or pins 98a, 98b. Referring to FIG. 5, the lower end of the spindle cover 96 has a generally U-shaped clevis 101. The roller truck 100 is pivotally mounted within the clevis 101 of the spindle cover 96 by a pair of shoulder bolts 103 that extend through clearance holes in opposed arms of the clevis 101 and are threaded into opposite sides the spindle cover 96. One of the rollers 97a, 97b is located on each side of the tool 94 and the joint 32. Referring to FIG. 4, the rollers 97a, 97b contact the upper surfaces of the respective parts 28, 30. The rollers 97 turn about an axis of rotation 102 that is substantially perpendicular to the axis of rotation 104 of the tool 94 and substantially parallel to the longitudinal side rails 38, 40 (FIG. 1) of the base 24.

Referring to FIG. 6, the work supporting table 26 is comprised of an upper plate 106, a lower plate 107 and sidewalls 108 that separate the upper and lower plates 106, 107. Crossbeamns 109 (FIG. 4) extend between the upper and lower plates 106, 107 and the lateral sidewalls 108 at locations immediately below the weld joints 32, 33. The parts 23, 30, 31 are located on the table 26 by a lateral block or bar 111. The bar 111 is located on the side of the table 26 toward which the spindle 62 feeds during the welding process. Lateral clips 110 locate the parts 28, 30, 31 on a opposite side of the table. The part 31 is located at one end of the table 26 by blocks 112, and the part 28 is secured at the other end by clamps 114. The clamps 114 include a screw 116 that pushes a clamping element 118 against an end of the part 28. Thus, the clamps 114 are used to force the joints 32, 33 together. Clips 119 are located along the lateral edges of the parts 28, 30, 31 and extend over respective top surfaces 120 of the parts 28, 30, 31. The bar 111, clips 110, 119 and clamps 114 are principally used to locate the parts 28, 30, 31 at the desired position on the work supporting table 26.

The lateral bar 111 has gaps or cutouts adjacent the joints 32, 33 to be welded so that the rotating todl 94 can be moved past the bar 111. As will be appreciated, as the rotating tool leaves the ends of the joints 32, 33, material may blow out the side of the parts 28, 30, 31 ahead of the rotating tool, thereby reducing the consistency and quality of the weld at the end of the joints 32, 33. In order to maintain high quality welds throughout the joints 32, 33, one or more blocks 113 of the material being welded are secured in the gaps of the lateral bar 111. Thus, at the end of the joints 32, 33, the rotating tool passes through the blocks 113. The blocks 113 are then removed by machining; and the joints 32, 33 have a consistent and uniform weld throughout their entire length. The blocks 113 are secured in place by being fastened or attached to, or otherwise secured at, the lateral edge of the parts 28, 30, 31 at the ends of the joints 32, 33 in a known manner.

Figure 8:
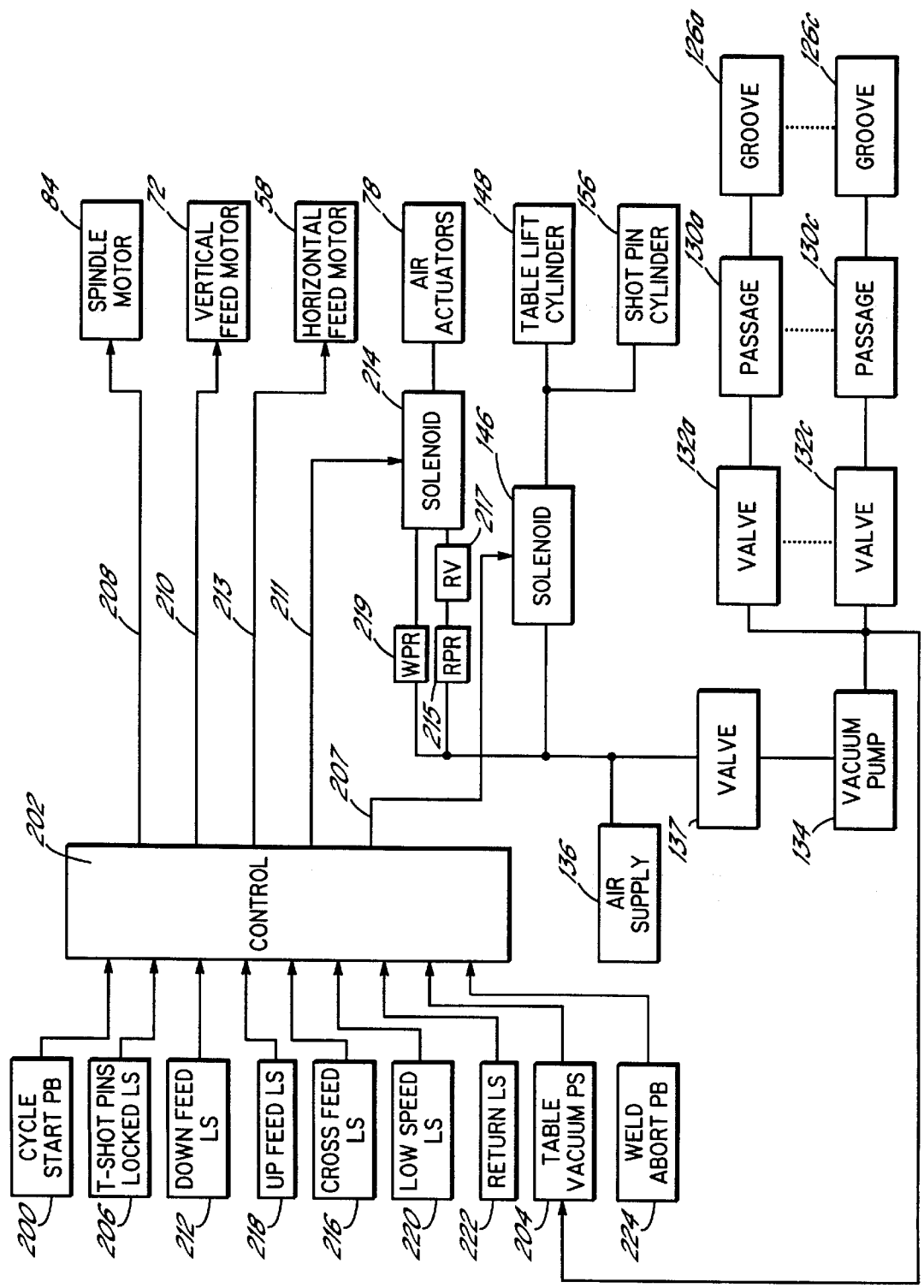
FIG. 8 is a schematic block diagram of a control system for the electrical and fluid operated devices on the friction stir welding machine of FIG. 1.

In FIG. 6, the table 26 has vacuum clamping systems 123a, 123b, 123c for each of the respective parts 28, 30, 31. The vacuum systems 123 are located in the top surface 122 of the table 26. The top surface 122 beneath the parts 28, 30,31 has respective seals 124a, 124b, 124c. The seals form a closed loop or path inside the outer periphery of each of the parts 28, 30, 31. The seals 124 are also located as close as possible to the joints 32, 33 without being adversely affected by heat from the welding process. Inside the closed path of the seals 124a, 124b, 124c are respective vacuum channels 126a, 126b, 126c. FIG. 7 is an enlarged view of the vacuum system 123b and is exemplary of the construction of all of the vacuum systems 123. The seal 124b is disposed within a groove 128b in the upper surface 122 of the worktable 26. Immediately adjacent the groove 128b, but inside the closed loop of the seal 124b, is an air groove 126. The air groove 126b is connected to one end of respective supply passages 130b extending through the top plate 106 of the table 26. The other end of the supply passage 130b is in fluid communication with one side of a manually operated valve, for example, a ball valve 132b as shown in FIG. 8. The other side of the valve 132b is connected to a vacuum pump 134. Thus, for each of the parts 28, 30, 31, there is an independent and separately controllable vacuum system 123 comprised of a seal 124, an air groove 126, fluid passage 130 and valve 132. The valves 132a, 132b, 132c (FIG. 8) are connected to the vacuum pump 134 that, in turn, is driven from a source of pressurized air 136 such as that normally found in manufacturing environments. A master valve, for example, a ball valve, 137 is connected between the air supply 136 and the vacuum pump 134 to control the operation of the vacuum pump 134.

In use, referring to FIG. 6, using the clips 110, 119, stops 112 and clamps 114, the parts 28, 30, 31 to be welded are located on the top surface 122 of the table 26. Thereafter, via operator action, the appropriate ones of valves 132 (FIG. 8) are opened to permit a partial vacuum, that is, a pressure less than atmospheric pressure, to be pulled in respective grooves 126. The partial vacuum in the grooves 126 and any contiguous spaces between the bottom of the parts 28, 30, 31 and the top surface 122 of the table 26 provide a substantial force that firmly secures the parts 28, 30, 31 to the top surface 122 of the worktable 26.

Referring to FIG. 6, the table 26 is supported by a pair of wheels 142 on each side of the table 26 that ride on two tracks 140 rigidly connected to the longitudinal side rails 38, 40. The wheels 142 are rotatably mounted to respective table lift arms 144 which are located near the ends of two opposed side walls 108 of the table 26. The table lift arms are pivotally mounted to respective pivot pins 145. The wheels 142 and tracks 140 often have a mating V-shaped cross-sectional profile that automatically centers the wheels 142 on the track 140. The wheels 142 and tracks 140 are commercially available from Bishop Wisecarver of Pittsburgh, Calif. Thus, the table 26 is manually movable along the tracks 140 to a desired position.

In order to weld the joint 32, the table 26 is manually moved along the rails 140 until the joint 32 is positioned over the anvil 48 (FIG. 1). Referring to FIG. 4, when the table 26 is properly positioned, the beam 109, which is immediately below the upper plate 106 of the table 26 and the joint 32, is positioned over the anvil 48. With the joint 32 located immediately over the anvil 48, referring to FIG. 2, a pair of cylinders 156 at each end of the anvil 48 are actuated by the operator to drive shot or locating pins 158 into registration holes 159 (FIG. 4) in the lower plate 107 of the table 26. The shot pins 158 function to precisely position the worktable 26 with respect to the rotating tool 94. In a known manner, one of the registration holes is cylindrical while the other of the registration holes is slightly elliptical with the major axis being parallel to the anvil 48. Thus, the table is aligned parallel to the anvil 48 but can shift slightly transversely to accommodate the location of the wheels 142 (FIG. 6) on the V-shaped track 140.

Referring to FIG. 8, the shot pin cylinders 156 are operated by a solenoid 146 which also, at the same time, operates a pair of cylinders 148 (FIGS. 1 and 6) on each side of the table 26 close to the forward end 150 and a pair of cylinders 149 on each side of the table close to the rear end 151. Operating the cylinders 148, 149 moves the respective lift arms 144 downward, thereby lowering the table 26. Lowering the table 26 brings the bottom surface 152 (FIG. 4) of the table 26 in contact with the top surface 154 of the anvil 48 with the pins 158 properly aligned in the holes 159. Thus, the beam 109 and anvil 48 react all of the vertical forces imposed on the parts 28, 30 in friction stir welding the joint 32. Even though the cylinders 148, 149, 156 are operated at the same time, it is important that the shot pins 158 are fully extended in the registration holes 159, thereby properly aligning the table 26 before the table comes to rest on top of the anvil 48. Thus, bleed adjustments on the cylinders 148, 149, 156 are set such that the cylinders 156 fully extend the shot pins 159 before the cylinders 148, 149 lower the table 26 onto the anvil 48.

Figure 9:
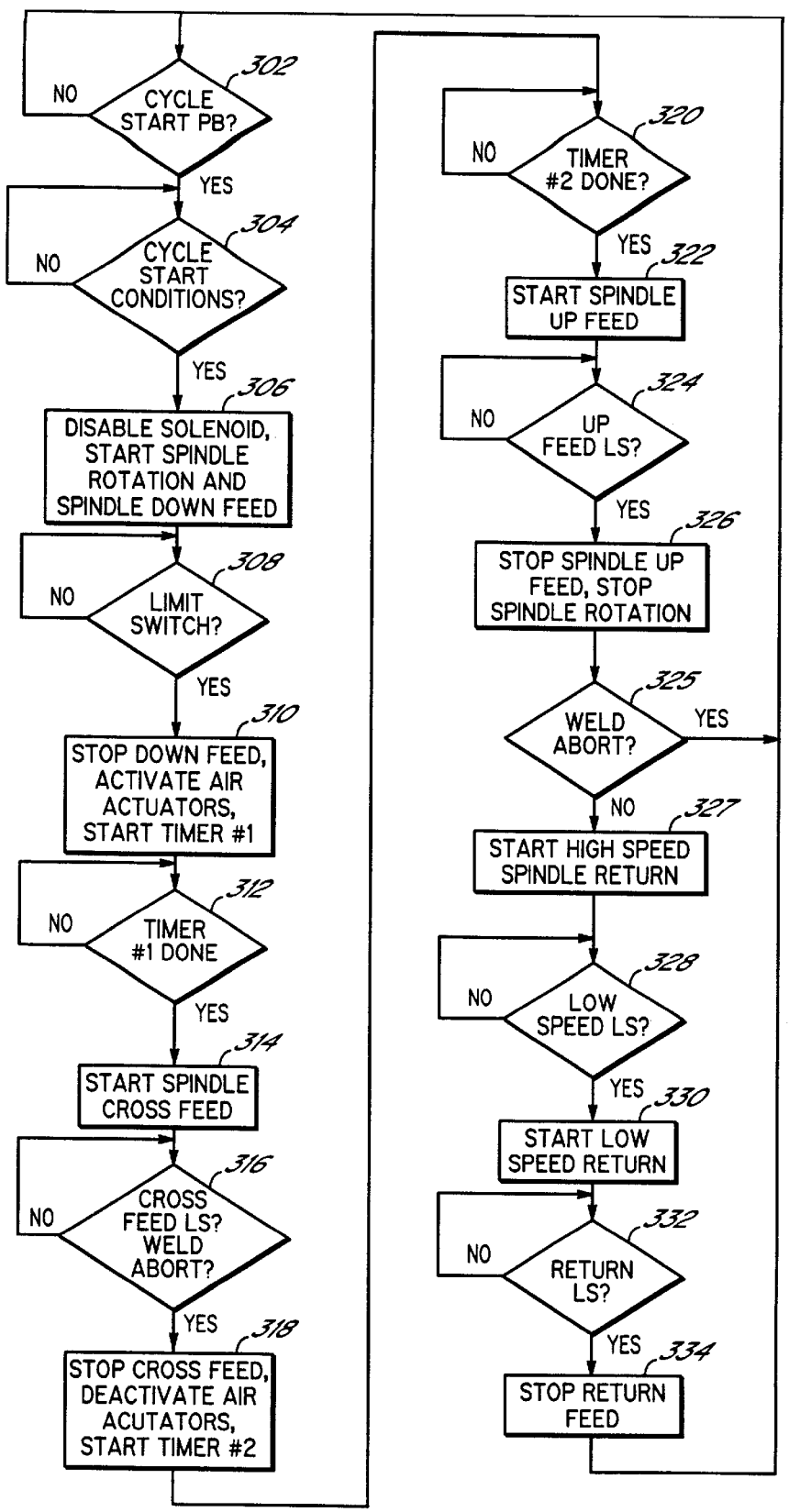
FIG. 9 is a flowchart illustrating a welding cycle using the friction stir welding machine of FIG. 1.

Once the worktable 26 is properly positioned with the joint 32 directly over the anvil 48, a friction stir welding process is initiated. Referring to FIG. 8, upon an operator activating a cycle start button 200, a signal is provided to a control 202. There are many commercially available controls suitable of this purpose, and one such control is a GE Fanuc programmable logic controller commercially available from Cincinnati Electric of Cincinnati, Ohio. In order to execute a welding cycle, the control 202 initiates a process as illustrated in FIG. 9 by which friction stir welding a joint is accomplished.

After determining, at 302, that a cycle start push button has been depressed, the control, at 304, checks whether the friction stir welding machine is in the appropriate state to execute a friction stir welding process. For example, the control 202 will check the state of a table vacuum pressure switch 204 to determine if the desired vacuum exists, for example, 25 inches Hg. Next at 304, the control 202 checks the states of the shot pin limit switches 206 that change state when the shot pins are fully extended into the table 26. For purposes of this description, a limit switch refers to any electrical/mechanical device that provides a feedback signal indicating that a desired position has been achieved by the component being monitored. If the shot pins are in their desired position in the table 26, the control 202 then, at 306, disables solenoid 146. The control 202 provides a signal over an output 207 to solenoid 146 which electrically clamps or locks the solenoid 146 in its current state. That prevents the solenoid 146 from being erroneously or inadvertently switched during the welding process.

At process step 306 (FIG. 9), the control 202 also provides a command signal over output line 208 to start the spindle motor 84, thereby rotating the tool 94 at the desired rate, for example, 700 revolutions per minute. The control 202 further provides a command signal over line 210 to initiate operation of the vertical feed motor 72 in a direction causing the screw 66 to move the spindle 62 downward toward the joint 32 to be welded. The control 202 then, at 308 of FIG. 9, detects the state of a downfeed limit switch 212. As previously mentioned, the downfeed limit switch 212 can be any device mechanical or electrical that provides a feedback signal indicating that the monitored device, for example, the spindle 62, has been moved downward to its desired position.

Referring to FIG. 3, as the screw 66 rotates, the nonrotating nut 68 carrying the bracket 70 moves linearly from its raised position downward toward a lower end of the screw 66, thereby lowering the spindle 62 and the rotating tool 94. It should be noted that as the nut 68, bracket 70 and spindle 62 are moving vertically downward, referring to FIG. 2, the brackets 76 connected at one end to the spindle 62 are also moving downward and pulling with them movable portions 77 of the actuators 78. Thus, the movable portions 77 of the actuators 78 must have a range of travel equal to the expected range of vertical travel of the spindle 62.

When the rotating tool 94 contacts the joint 32 formed by the parts 28, 30, the control 202 continues to command the operation of the vertical feed motor 72; and referring to FIG. 10, the nut 68 continues to feed downward with respect to the bracket 70. As the nut 68 loses contact with the bracket 70, the load of the spindle 62 is no longer being carried by the nut 68, but instead, is being carried by the rotating tool 94. The motor 72 continues to rotate the screw 66 until the nut 68 achieves its desired position as detected by a downfeed limit switch 212. The desired position of the nut 68 is a vertical distance or displacement below the bracket 70 that is equal to the thickness of the weld joint 32 plus some clearance value. The thickness of the weld joint is normally equal to the length of the rotating tool 94 or the stroke of penetration of the rotating tool 94 into the joint 32. The nut 68 generally does not rest on the shoulder bolts 69, but the shoulder bolts 69 will catch, and limit the displacement of, the nut 68 in the event that the screw 66 or some other component breaks.

Upon the control 202 detecting a change of state of the downfeed limit switch 212 indicating that the nut 68 is in its desired position below the bracket 70, the control 202 at 310 of FIG. 9, provides a command signal on output 210 to stop the operation of the vertical feed motor 72. At the same time, the control 202 provides a command signal over line 211 to operate a solenoid 214 providing a regulated, higher pressure air to the actuators 78. When the actuators 78 are not activated, pressurized air from an air supply 136 is applied to a retract pressure regulator 215 and a pressure relief valve 217. The pressure regulator is set to a lower pressure, for example, 20 psi, and the relief valve is set to a slightly higher pressure, for example, 22 psi. The pressurized air is also supplied to a weld pressure regulator 219 which provides a higher, regulated air pressure, for example, 93 psi to the solenoid 214. The command signal causes the solenoid 214 to apply the higher pressure air from regulator 219 to the actuators 78.

The control 202 also activates or starts a first internal timer. The timer provides a first delay period, for example, approximately 20 seconds, during which operation of the air actuators 78 causes the movable portions 77 of the actuators 78 to be moved downward by the pressurized air. The downward motion of the movable portions 77 of the actuators 78 applies a large force through the bracket 76, the spindle 62 and the rotating tool 94 of approximately 11,000 pounds. That force, in addition to the force provided by the weight of the spindle, is described herein as a weld processing force, and that force pushes a full length of the rotating pin 93 in the solid metal of the parts 28, 30 adjacent the joint 32 and maintains the rotating shoulder 95 in contact with the upper surfaces of the parts 28, 30.

Thus, the use of the dual drives 65, 78 and their respective reacting cross members 44, 46, provides optimum performance of those components as well as the friction stir welding machine itself. Further, the drive 65 is designed to simply position the tool 94 when it is not engaged in the welding process, and components, such as a screw drive, normally used for such purposes are utilized. However, the drive 78 can be optimized to simply provide the necessary force without any concern for the displacement of the tool 94 which is controlled by the rollers 97. Thus, actuators 78, which are relatively inexpensive, are chosen to provide a relatively constant force of the desired magnitude over the limited stroke of the actuators that is required to move the rotating pin 93 into the parts 28, 30 and maintain the rotating shoulder 95 against the parts 28, 30. Further, that relatively constant force is applied independent of any deflections normally occurring in the machine structure.

In addition, the large weld processing forces are reacted through the center of the bottom side of the upper cross member 46 and thus, reacted through the centerline of the cross member 46 and the other components of the frame 22. Hence, those very large processing forces do not have a moment arm with which to apply a torque to the components of the frame 22 or a shear load to cause vertical deflection. In contrast, known designs apply a weld processing force with a drive mounted on a side of a machine cross member similar to the intermediate cross member 44, the application of the large processing forces on the side of a cross member can create a substantial torque within the cross member.

The current design has a further advantage of disengaging the nut 68 of the drive 65 from the bracket 70, and hence, the weld processing forces generated by the actuators 78 are independent of the drive 65. By removing the very large weld processing forces from the screw 66 and nut 70 of the drive 65, the size of the drive 65 is subject to less wear.

As the actuators 78 force the rotating pin 93 into the parts 28, 30 adjacent the joint 32, referring to FIG. 4, the rollers 97a, 97b contact the upper surface of the parts 28, 30 on either side of the joint 32. The continued application of the weld processing force by the actuators 78 causes the rollers 97 to apply that weld processing force against the parts 28, 30 adjacent the weld joint 92, thereby providing a significant clamping force against the parts 28, 30 at locations adjacent the joint 32. That force is transmitted through the worktable 26 via the beam 109 of FIG. 4 to the anvil 48. Further, the weld processing force applied by the actuators 78 is reacted by the upper cross member 46 of the frame 22. If the parts 28, 30 have slightly different thicknesses, the roller truck 100 pivots so that the force applied by roller 97a against the part 30 is the same as the force applied by roller 97b against part 28. Further, by pivoting to accommodate different part thicknesses, the roller support 100 lowers slightly so that the depth of the weld is averaged as a function of the difference in thicknesses of the parts 28, 30.

Upon detecting the expiration of the first timer, at 312 of FIG. 9, the control 202 then, at 314, provides a command signal over line 213 (FIG. 8) to operate the horizontal feed motor 58. The horizontal feed motor rotates the screw 56 in a direction causing the spindle carrier 50 and spindle 62 to traverse the rotating tool 94 through the joint 32, and plasticized metal passes around the rotating tool, thereby bonding the adjacent edges of the parts 28, 30 along the joint 32. After the plasticized metal cools and hardens, the parts 28, 30 are solidly welded together. The operation of the horizontal feed motor continues until the control, at 316 (FIG. 9), detects a change of state of a cross feed limit switch 216 (FIG. 8). The cross feed limit switch 216 changes state when the spindle carrier 50 and spindle 62 have been moved across the worktable 26 to the end of the joint 32. At that point, at 318 (FIG. 9), the control 202 changes the state of the command signal to the horizontal feed motor 58, thereby stopping the horizontal feed motor 58 and the horizontal travel of the spindle carrier 50 and spindle 62.

In addition, the control 202 changes the state of the signal on line 211 and the state of the solenoid 214, thereby connecting the low pressure air from the regulator 215 to the actuators 78. The control 202 also actuates a second internal timer providing a second time delay, for example, a five second delay. During that second time delay, air bleeds from the actuators 78, and the weld processing forces are removed from the spindle.

Upon detecting, at 320, the expiration of the second time delay, the control 202 provides a signal on line 210 to the vertical feed motor 72 commanding the vertical feed motor to rotate the screw 66 in a direction causing the nut 68 to move vertically upward, thereby lifting the bracket 70 and spindle 62 vertically upward. Upon detecting, at 324, a change of state of the upfeed limit switch 218 indicating that the spindle 62 is located at its desired uppermost position, the control 202, at 326 of FIG. 9, provides a command signal over line 210 to stop the operation of the vertical feed motor 72. In addition, the control 202 provides a signal over line 208 commanding the spindle motor 84 to stop. Next, assuming that there is no weld abort condition as detected at 325, the control 202 at 327 then provides a signal over line 213 commanding the horizontal feed motor 58 to operate the ball screw 56 in a direction causing the spindle carrier 50 and spindle 62 to move back toward their starting positions at a high velocity. The control 202, at 328 of FIG. 9, detects a change of state of a low speed limit switch 220 indicating that the spindle carrier 50 and spindle 62 are at a location at which a lower velocity motor operation should be initiated. The controller 202, al 330, then provides an output signal over line 213 commanding the horizontal feed motor 58 to operate at the desired lower velocity. The spindle carrier 50 and spindle 62 continue to move toward their starting positions until, at 332 of FIG. 9, the control 202 detects a return limit switch 222 changing state indicating that the initial positions have been achieved. The control then, at 334, provides a command signal over line 213 to stop the operation of the horizontal feed motor 58.

As will be appreciated, any attempt to stop the welding process by simply shutting off the power while the rotating tool 94 is in the weld joint results in the plasticized metal hardening around the tool 94. Extracting the tool 94 from the partially welded parts 28, 30 is difficult, time consuming and takes the machine out of production. Therefore, the control 202 includes a weld abort cycle which can be initiated by an operator using a weld abort pushbutton 224 or can be automatically initiated by the control 202 in response to a process condition, for example, a loss of vacuum as detected by the table vacuum pressure switch 204. A weld abort condition is detected at 316 of FIG. 9, and if a weld abort condition exists, the control 202 executes the process of steps 318–326 as previously described. Thus, the cross feed is stopped; the spindle is moved up from the parts 28, 30 and the spindle is stopped. The weld abort condition is detected by the control at 325, and the control process is stopped. The rotating tool has thus been automatically removed from the weld joint 32 and the spindle stopped in an orderly procedure.

While the present invention has been illustrated by a description of various preferred embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art. For example, in the described embodiment, while the drive 78 functioning as a weld force generator is identified as a pair of a particular type of air actuator, as will be appreciated, the drive 78 or weld force generator can be implemented with any type and number of actuators that provides the desired weld processing force. Further, the actuators 78 can be powered by electricity or a pressurized fluid such as air or a hydraulic fluid. Further, the drives 54, 65 are described as screw drives; however, as will be appreciated, the drives 54, 65 can be implemented with a fluid drive, for example, a hydraulic cylinder, a rack and pinion drive, a chain drive, a cable drive, etc.

Figure 11:
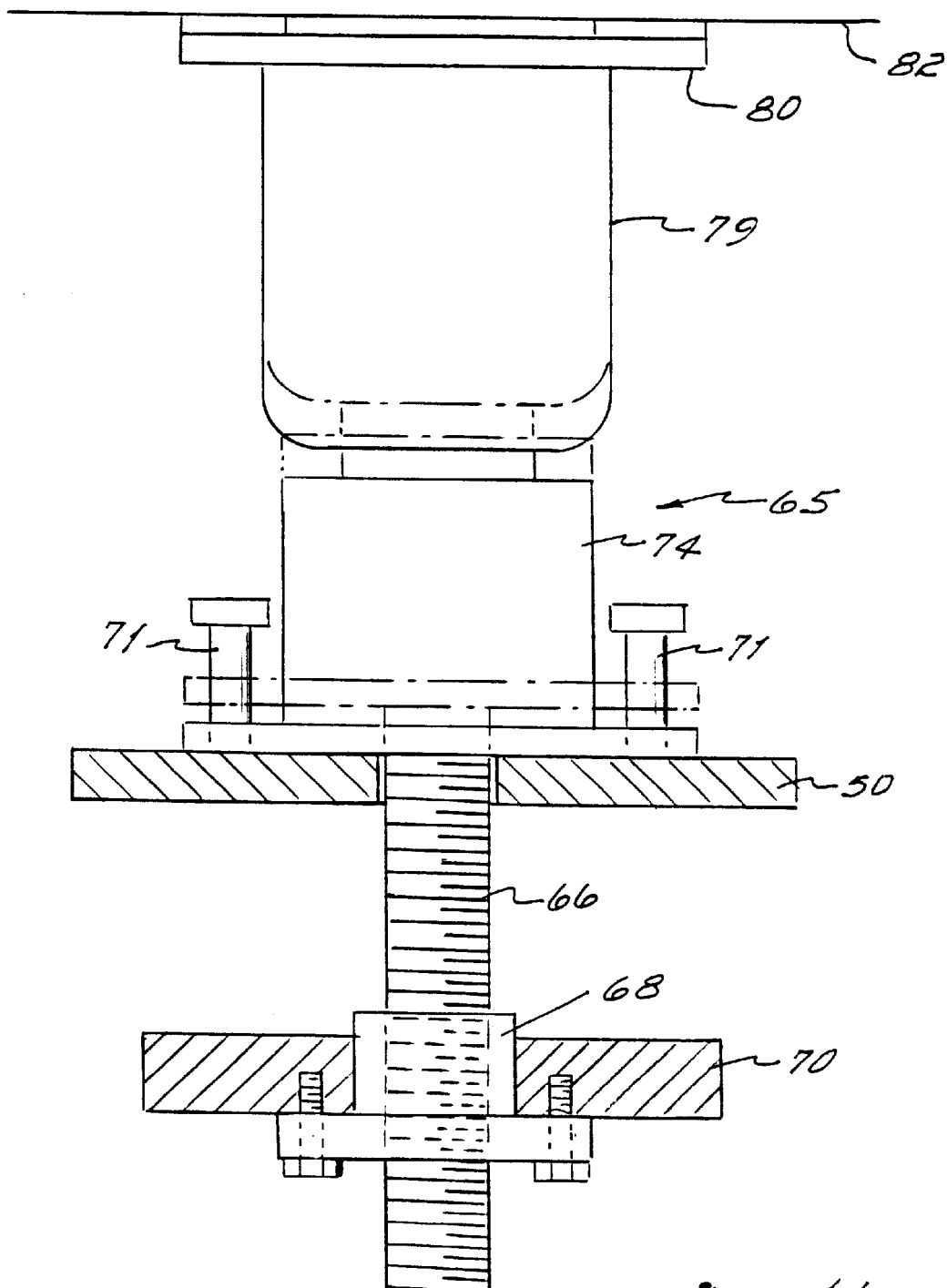
FIG. 11 is a diagrammatic cross-sectional view of an alternative embodiment of the a displacement drive and a force drive for the rotating tool.

In the described embodiment, the vertical drive 65 is disengaged from the spindle 62 by allowing the nut 68 to drop out of a bracket 70 after the rotating tool 94 contacts the workpiece. Further, the drive 78 is connected to the spindle 62 and thus, the actuator 78 must have a range of motion equal to the full vertical travel of the spindle 62. In some applications, finding an actuator 78 that provides a substantially constant force over that full range of motion may be difficult. As will be appreciated, there are other machine constructions that provide a weld process force generator and reacting force structure that is separate from a tool positioning drive. For example, referring to FIG. 11, in one alternative embodiment, the gear box 74 is mounted on the spindle carriage 50 with shoulder bolts 71. Further, an actuator 79 functioning as a welding force generator is mounted to the gear box 74; and in contrast to the earlier described embodiment, the nut 68 is rigidly connected to the bracket 70. The shoulder bolts 71 permit the gear box 74 to be moved upward and off of the spindle carriage 50 through a displacement that is at least equal to the expected displacement of the actuator 78. As the screw 66 is rotated to lower the bracket 70 carrying the spindle, the rotating tool contacts the parts as previously described. However, since the nut 68 is fixed to the bracket 70 and the nut 68 is then fixed in elevation by the tool contacting the part, continued rotation of the screw 66 will lift the gear box 74 off of the spindle carriage 50. When the actuators 79 are operated, they push the screw 66, nut 68, bracket 70 and the attached spindle and rotating tool downward until the rollers contact the parts as previously described.

With this alternative embodiment, the movable portion of the actuator 79 does not move through the entire range of motion of the spindle, but instead, the movable portion of the actuator 79 only has to move through a stroke that is necessary to force the rotating tool into the workpiece, that is, the length of the rotating pin. This embodiment also has a force limiting function. If one of the rollers 97 moves over a bump caused by a variation in the thickness of a part 28, 30 or a chip on the surface of a part 28, 30, the roller will move vertically upward. Since the gear box 74 is floating on the spindle carrier 50, as the roller rises, the spindle 62, bracket 70, nut 68 screw 66, and gear box 74 also rise. Thus, the reactive force is always equal to the applied weld processing force. In addition, with this alternative embodiment, it is possible to maintain the actuator 79 activated all the time, that is, powered so that it is continuously providing the weld processing force. However, this embodiment transmits the weld processing forces through the screw 66 and nut 68; and therefore, they would be subject to more wear than in the earlier described embodiment.

In the described embodiment, the vacuum systems 123 on the table 26 are controlled by respective valves 132, and there is a separate vacuum system for each part to be used on the table. As will be appreciated, other vacuum systems may be used. For example, the upper plate 106 of the table 26 may contain a plurality of bores located in a grid or matrix, and a mechanical valve is mounted in each hole. Such a mechanical valve is normally-closed and has a stem projecting above an upper surface of the upper plate 106 such that the stem is depressed by a part being placed on the table over the valve. The part depressing the stem operates the valve to apply a partial vacuum pressure through the valve and into the volume between the top of the table and the lower surface of the part. Thus, a vacuum is applied at every point where the part lies over a table mounted valve. Further the joint between the peripheral edge of the part and the table can be sealed with a tape to prevent the vacuum from leaking. In addition, to further seal the vacuum, the joint between the! parts can be covered with a tape or other material that does not interfere with the welding process. The tape can be consumed by the welding process, or alternatively, as the tool advances, the tape can be pushed back on itself by an edge of the tool holder or the pressure of a "bow wave" advancing under the tool. In another embodiment, the tape can be peeled off of the joint and rolled up by an attachment mounted on the spindle or another part of the machine. In a further alternative, another sealing material, for example, metal shim stock, may be used to seal the joint and then pulled away or rolled up as the rotating tool advances along the joint.

Therefore, the invention in its broadest aspects is not limited to the specific detail shown and described. Consequently, departures may be made from the details described herein without departing from the spirit and scope of the claims which follow.

What is claimed is:

1. A friction stir welding machine comprising:

a table adapted to support material to be welded;

a frame extending over the table and having first and second frame elements;

a spindle rotatably supporting a tool;

a first drive supported by the first frame element and operatively connected to the spindle for moving the tool in a first direction toward the table, the first drive disengaging from the spindle after the tool contacts the material supported on the table; and a second drive supported by the second frame element and operatively connected to the spindle for applying processing forces to force the tool now rotating in the first direction into the material, thereby initiating friction stir welding.

2. The friction stir welding machine of claim 1 wherein the first frame element includes a first bearing for supporting the spindle and reacting first forces generated by the first drive in moving the tool into contact with the material.

3. The friction stir welding machine of claim 2 wherein the second element includes a second bearing for supporting the spindle and reacting the processing forces generated by the second drive during the friction stir welding.

4. The friction stir welding machine of claim 3 wherein first and second bearings support the spindle for sliding motion.

5. The friction stir welding machine of claim 3 wherein first and second bearings support the spindle for sliding linear motion.

6. The friction stir welding machine of claim 1 wherein the second drive generates forces substantially greater than the first forces generated by the first drive.

7. The friction stir welding machine of claim 1 wherein the first drive includes a screw and nut, the nut supporting the spindle when the tool is not in contact with the material.

8. The friction stir welding machine of claim 7 wherein the spindle further includes a bracket and the nut has a supporting relationship with the bracket, such that as the screw rotates the nut moves the bracket and the spindle in the first direction.

9. The friction stir welding machine of claim 8 wherein the nut disengages from the bracket after the tool contacts the material in response to the screw turning in a direction moving the nut in the first direction.

10. The friction stir welding machine of claim 1 wherein the first drive moves the spindle in a substantially vertical direction.

11. The friction stir welding machine of claim 1 further comprising a third drive mounted on the frame and operatively connected to the spindle for moving the tool in a second direction.

12. The friction stir welding machine of claim 11 wherein the third drive moves the tool in a substantially horizontal direction.

13. A method of operating a friction stir welding machine to weld a joint between two adjacent parts comprising:

moving a spindle having a tool into contact with the joint to be welded using a first drive;

rotating the tool;

moving the tool into the joint between the parts with a second drive separate from the first drive; and moving the tool along the joint between the parts with a third drive while holding the tool in the joint with the second drive to friction stir weld in the joint, thereby welding the parts together.

14. The method of claim 13 further comprising moving the tool out of the work with the first drive.

15. The method of claim 13 further comprising isolating forces created by the second drive from being reacted by the first drive.

16. The method of claim 14 further comprising:

reacting forces created by the first drive with a first frame element; and reacting forces created by the second drive with a second frame element.

* * * * *

UNITED STATES PATENT AND TRADEMARK OFFICE
CERTIFICATE OF CORRECTION

PATENT NO.   : 6,302,315 B1
DATED        : October 16, 2001
INVENTOR(S)  : Jack Mansfield Thompson It is certified that error appears in the above-identified patent and that said Letters Patent is hereby corrected as shown below:

Column 1,
Line 39, reads "gage" and should read -- gauge --.

Column 2,
Line 49, reads "parts to clamped" and should read -- parts to be clamped --.

Column 3,
Line 37, reads "first and second mutually directions" and should read -- in first and second mutually perpendicular directions --.

Column 4,
Line 13, reads "embodiment of the a" and should read -- embodiment of a --.
Line 44, reads "column 363" and should read -- column 36 --.

Column 5,
Line 64, reads "sides the spindle" and should read -- sides of the spindle --.

Column 6,
Line 8, reads "Crossbeamns" and should read -- Crossbeams --.
Line 11, reads "parts 23, 30, 31" and should read -- parts 28, 30, 31 --.
Line 25, reads "todl" and should read -- tool --.

Column 8,
Line 6, reads "suitable of this" should read -- suitable for this --.

Column 11,
Line 7, reads "al" and should read -- at --.

UNITED STATES PATENT AND TRADEMARK OFFICE
CERTIFICATE OF CORRECTION

PATENT NO.   : 6,302,315 B1
DATED        : October 16, 2001
INVENTOR(S)  : Jack Mansfield Thompson It is certified that error appears in the above-identified patent and that said Letters Patent is hereby corrected as shown below:

Column 12,
Line 30, reads "nut 68 screw 66" and should read -- nut 68, screw 66 --.
Line 58, reads "the!" and should read -- the --.

Signed and Sealed this

Tenth Day of September, 2002

Attest:

JAMES E. ROGAN
Attesting Officer       Director of the United States Patent and Trademark Office